(12) United States Patent
Imamura et al.

(10) Patent No.: US 9,499,053 B2
(45) Date of Patent: Nov. 22, 2016

(54) ELECTROMOTIVE VEHICLE HAVING ENERGY AND POWER BATTERIES, AND CONTROL METHOD FOR THE SAME

(71) Applicants: Tatsuya Imamura, Okazaki (JP); Tooru Matsubara, Toyota (JP); Kenta Kumazaki, Toyota (JP); Takeshi Kitahata, Toyota (JP); Yasuhiro Hiasa, Nagoya (JP); Atsushi Tabata, Okazaki (JP)

(72) Inventors: Tatsuya Imamura, Okazaki (JP); Tooru Matsubara, Toyota (JP); Kenta Kumazaki, Toyota (JP); Takeshi Kitahata, Toyota (JP); Yasuhiro Hiasa, Nagoya (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/650,085

(22) PCT Filed: Dec. 13, 2013

(86) PCT No.: PCT/IB2013/002749
§ 371 (c)(1),
(2) Date: Jun. 5, 2015

(87) PCT Pub. No.: WO2014/096925
PCT Pub. Date: Jun. 26, 2014

(65) Prior Publication Data
US 2015/0314685 A1 Nov. 5, 2015

(30) Foreign Application Priority Data
Dec. 21, 2012 (JP) .................................. 2012-279404

(51) Int. Cl.
*H02P 27/04* (2016.01)
*B60L 3/00* (2006.01)
(Continued)

(52) U.S. Cl.
CPC ............... *B60L 3/0046* (2013.01); *B60L 7/14* (2013.01); *B60L 11/005* (2013.01); *B60L 11/123* (2013.01);
(Continued)

(58) Field of Classification Search
CPC .... B60L 11/1809; B60L 3/0046; B60L 7/14; Y02T 10/7088; Y02T 10/7044
USPC ............. 318/139, 800, 801, 400.01, 400.14, 318/400.15, 400.21, 400.22, 701, 727, 799, 318/432, 599, 374, 375, 376; 320/104, 108, 320/109, 137, 138; 180/65.1, 65.29, 65.23, 180/65.225, 65.275
See application file for complete search history.

(56) References Cited

U.S. PATENT DOCUMENTS

| | | | |
|---|---|---|---|
| 8,423,210 B2* | 4/2013 | Kato | B60K 6/445 180/65.1 |
| 8,648,565 B2* | 2/2014 | Mitsutani | B60K 6/445 320/103 |
| 2006/0244411 A1 | 11/2006 | Wobben | |
| 2011/0101915 A1* | 5/2011 | Mitsutani | B60K 6/445 320/109 |

(Continued)

FOREIGN PATENT DOCUMENTS

| | | |
|---|---|---|
| DE | 10331084 A1 | 3/2005 |
| JP | 2010029051 A | 2/2010 |
| JP | 2011199934 A | 10/2011 |
| WO | 2009028520 A1 | 3/2009 |

*Primary Examiner* — Antony M Paul
(74) *Attorney, Agent, or Firm* — Oliff PLC

(57) ABSTRACT

A hybrid vehicle includes electrical storage devices, a charging device, a motor generator, a diode, an outlet and a relay. The first electrical storage device stores driving electric power. The charging device charges the first electrical storage device with the user of a power supply outside the vehicle. The motor generator has a power generation function. The second electrical storage device stores electric power that is generated by the motor generator. When electric power is output to a device outside the vehicle from the outlet, the relay limits electric power, which is output from the first electrical storage device, such that electric power stored in the second electrical storage device is output.

15 Claims, 6 Drawing Sheets

(51) Int. Cl.
    *B60L 11/18*    (2006.01)
    *B60L 7/14*     (2006.01)
    *B60L 11/00*    (2006.01)
    *B60L 11/12*    (2006.01)
    *B60L 11/14*    (2006.01)
    *B60L 15/20*    (2006.01)

(52) U.S. Cl.
    CPC ............ B60L 11/14 (2013.01); B60L 11/1809 (2013.01); B60L 11/1816 (2013.01); B60L 11/1842 (2013.01); B60L 11/1844 (2013.01); B60L 11/1846 (2013.01); B60L 11/1861 (2013.01); B60L 11/1864 (2013.01); B60L 15/2009 (2013.01); *B60L 2210/12* (2013.01); *B60L 2210/14* (2013.01); *B60L 2210/30* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/486* (2013.01); *B60L 2240/662* (2013.01); *B60L 2250/16* (2013.01); *B60L 2250/24* (2013.01); *B60L 2250/26* (2013.01); *B60L 2260/26* (2013.01); *B60L 2270/142* (2013.01); *Y02E 60/721* (2013.01); *Y02T 10/6217* (2013.01); *Y02T 10/645* (2013.01); *Y02T 10/7005* (2013.01); *Y02T 10/7022* (2013.01); *Y02T 10/7044* (2013.01); *Y02T 10/7061* (2013.01); *Y02T 10/7072* (2013.01); *Y02T 10/7077* (2013.01); *Y02T 10/7225* (2013.01); *Y02T 10/7233* (2013.01); *Y02T 10/7241* (2013.01); *Y02T 10/7275* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

2011/0133694 A1* 6/2011 Song .................. B60L 1/14
                                                      320/109
2011/0290572 A1  12/2011 Suzuki

* cited by examiner

|     | C1  | C2  | B1  | B2  | F1 |
|-----|-----|-----|-----|-----|-----|
| 1st | O   |     |     | (O) | △ |
| 2nd | O   |     | O   |     |   |
| 3rd | O   | O   |     |     |   |
| 4th |     | O   | O   |     |   |
| R   | O   |     |     | O   |   |
| N   |     |     |     |     |   |

O : ENGAGED (O) : ENGINE BRAKING IS ACTIVATED WHEN ENGAGED

△ : ENGAGED ONLY WHEN DRIVEN

ELECTROMOTIVE VEHICLE HAVING ENERGY AND POWER BATTERIES, AND CONTROL METHOD FOR THE SAME

BACKGROUND OF THE INVENTION

1. Field of the Invention

The invention relates to an electromotive vehicle and a control method for an electromotive vehicle and, more particularly, to an electromotive vehicle including a plurality of electrical storage devices and a control method for the electromotive vehicle.

2. Description of Related Art

Japanese Patent Application Publication No. 2011-199934 (JP 2011-199934 A) describes an electromotive vehicle on which a power supply system is mounted. The power supply system includes a high-capacity secondary battery and a high-power secondary battery. The high-capacity secondary battery is used to normally drive the electromotive vehicle, and the high-power secondary battery is used at the time of large acceleration, large deceleration, or the like, thus achieving a high-capacity and high-power power supply system (see JP 2011-199934 A).

In the above-described electromotive vehicle, the high-capacity electrical storage device is configured to be chargeable from a power supply outside the vehicle. The electromotive vehicle travels in an EV drive mode in which electric power supplied from the power supply outside the vehicle and stored in the high-capacity electrical storage device is used. On the other hand, it is conceivable that, when a device outside the vehicle needs electric power, electric power stored in the electrical storage device is supplied to the device outside the vehicle. However, if electric power stored in the high-capacity electrical storage device is supplied to, for example, the device outside the vehicle, an electric vehicle travel range that the vehicle is able to travel using electric power supplied from the power supply outside the vehicle and stored in the high-capacity electrical storage device reduces.

SUMMARY OF THE INVENTION

The invention provides an electromotive vehicle including an electrical storage device that stores electric power from a power supply outside the vehicle and that suppresses a reduction in electric vehicle travel range, and a control method for the electromotive vehicle.

An aspect of the invention provides an electromotive vehicle. The electromotive vehicle includes a first electrical storage device, a charging device, a rotary electric machine, a second electrical storage device and a controller. The first electrical storage device is configured to store driving electric power. The charging device is configured to charge the first electrical storage device with the use of a power supply outside the vehicle. The rotary electric machine is configured to have a power generation function. The second electrical storage device is configured to store electric power generated by the rotary electric machine. The controller is configured to suppress flow of electric power, which is generated by the rotary electric machine, to the first electrical storage device. The controller is configured to output electric power to a device outside the vehicle. The controller is configured to, when electric power is output to the device outside the vehicle, limit electric power to be output from the first electrical storage device, such that electric power stored in the second electrical storage device is output.

The controller may include a suppressing device configured to suppress flow of electric power generated by the rotary electric machine to the first electrical storage device. In addition, the controller may include an electric power output device configured to output electric power to the device outside the vehicle. In addition, the controller may include an output limiting device configured to, when electric power is output to the device outside the vehicle, limit electric power to be output from the first electrical storage device, such that electric power stored in the second electrical storage device is output. In addition, the controller may include an interrupting device configured to interrupt output of electric power from the first electrical storage device. In addition, the electromotive vehicle may further include a driving device configured to drive the rotary electric machine. Here, the interrupting device may include a relay provided between the driving device and the first electrical storage device.

In addition, the controller may be configured to cancel limitations on output of electric power from the first electrical storage device when the rotary electric machine generates travel driving force.

In addition, the electromotive vehicle may further include an internal combustion engine and a power transmission device. The internal combustion engine may be mechanically coupled to the rotary electric machine. The power transmission device may be configured to switch between a power transmitted state where power is transmitted to a drive wheel and a power interrupted state where transmission of power to the drive wheel is interrupted. The controller may be configured to, in the case where a state quantity that indicates a state of charge of the second electrical storage device has decreased, control the rotary electric machine such that the rotary electric machine generates electric power using power from the internal combustion engine when the power transmission device is in the power interrupted state.

In addition, the electromotive vehicle may further include a planetary gear unit. The planetary gear unit may be mechanically coupled to an output shaft of the internal combustion engine, a rotary shaft of the rotary electric machine and a drive shaft. The power transmission device may be provided between the drive shaft and the drive wheel.

In addition, the power transmission device may be a transmission. The transmission may be configured to be placed in a neutral state when a state quantity that indicates a state of charge of the second electrical storage device has decreased.

In addition, the controller may be configured to allow a user to determine a level of an operating sound of the internal combustion engine. The controller may be configured to set an operating point of the internal combustion engine such that, as the level of the operating sound determined by the user decreases, a rotation speed of the internal combustion engine decreases while output power of the internal combustion engine is kept. In addition, the controller may include a determination device configured to, allow the user to determine the level of the operating sound of the internal combustion engine.

In addition, the electromotive vehicle may further include a driving device. The driving device may be configured to drive the rotary electric machine. The controller may include a diode provided between the driving device and the first electrical storage device.

In addition, a rated stored energy of the first electrical storage device may be higher than a rated stored energy of the second electrical storage device. A rated output power of the second electrical storage device may be higher than a rated output power of the first electrical storage device.

Another aspect of the invention provides a control method for an electromotive vehicle. The electromotive vehicle includes a first electrical storage device, a charging device, a rotary electric machine, a second electrical storage device and a controller. The first electrical storage device is configured to store driving electric power. The charging device is configured to charge the first electrical storage device with the use of a power supply outside the vehicle. The rotary electric machine is configured to have a power generation function. The second electrical storage device is configured to store electric power generated by the rotary electric machine. The controller is configured to suppress flow of electric power, which is generated by the rotary electric machine, to the first electrical storage device. The controller is configured to output electric power to a device outside the vehicle. The controller is configured to limit electric power that is output from the first electrical storage device. The control method includes, when electric power is output to the device outside the vehicle, limiting electric power to be output from the first electrical storage device, such that electric power stored in the second electrical storage device is output.

With the thus configured electromotive vehicle and control method for the electromotive vehicle, the first electrical storage device is charged with the use of the power supply outside the vehicle, and the second electrical storage device is charged by the rotary electric machine. When electric power is output to a device outside the vehicle, electric power that is output from the first electrical storage device is limited such that electric power stored in the second electrical storage device is output. Thus, it is possible to prevent usage of electric power other than travel of the electromotive vehicle, the electric power being stored in the first electrical storage device. Thus, according to the invention, it is possible to suppress a reduction in an electric vehicle travel range in the electromotive vehicle that includes the electrical storage device that stores electric power from the power supply outside the vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
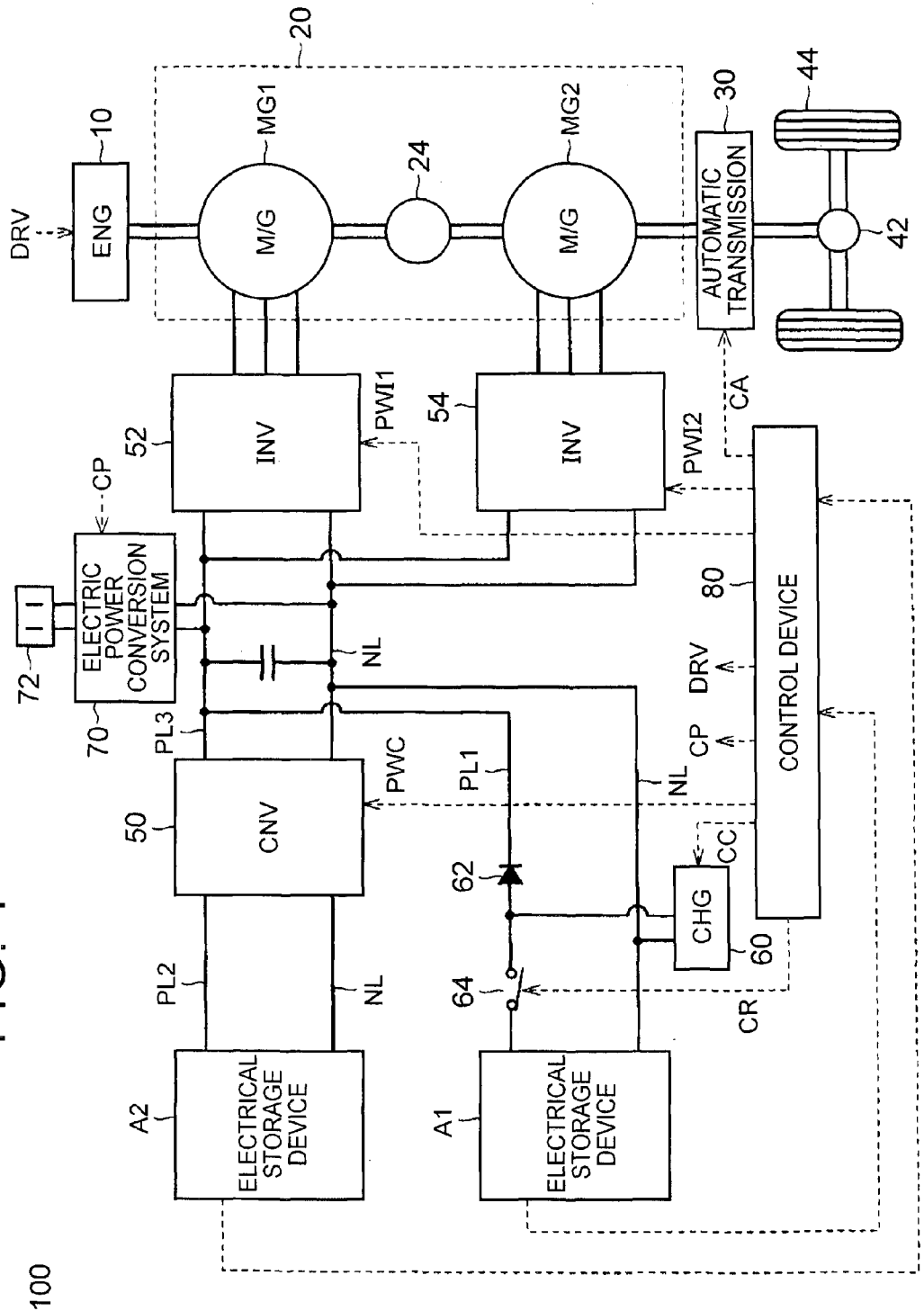
FIG. 1 is an overall configuration view of a hybrid vehicle that is shown as an example of an electromotive vehicle according to an embodiment of the invention.

Hereinafter, an embodiment of the invention will be described in detail with reference to the accompanying drawings. Like reference numerals denote the same or corresponding components in the drawings, and the description thereof will not be repeated.

First, the configuration of an electromotive vehicle will be described. FIG. 1 is an overall configuration view of a hybrid vehicle 100 that is shown as an example of the electromotive vehicle according to the embodiment of the invention. As shown in FIG. 1, the hybrid vehicle 100 includes an engine 10, a differential device 20, an automatic transmission 30, a differential gear unit 42 and drive wheels 44. In addition, the hybrid vehicle 100 further includes electrical storage devices A1, A2, a converter 50, inverters 52, 54, a charger 60, a diode 62, a relay 64, an electric power conversion system 70, an outlet 72 and a control device 80. The hybrid vehicle 100 is, for example, formed of a front-engine, front-wheel-drive (FF) system, and may be formed of another drive system.

The engine 10 is an internal combustion engine, and is, for example, formed of a gasoline engine, a diesel engine, or the like. The engine 10 converts thermal energy generated through combustion of fuel to kinetic energy of a motion component, such as a piston and a rotor, and outputs the converted kinetic energy to the differential device 20. For example, when the motion component is a piston and the motion is a reciprocal motion, reciprocal motion is converted to rotational motion via a so-called crank mechanism, and the kinetic energy of the piston is transferred to the differential device 20.

The differential device 20 is coupled to the engine 10. The differential device 20 includes motor generators MG1, MG2 and a power split unit 24. Each of the motor generators MG1, MG2 is an alternating-current rotary electric machine, and is, for example, formed of a permanent-magnet synchronous motor that includes a rotor in which a permanent magnet is embedded. The motor generators MG1, MG2 are respectively driven by the inverters 52, 54. The power split unit 24 distributes the power of the engine 10 between a transmission member, coupled to the automatic transmission 30, and the motor generators. The configuration of the differential device 20 will be described in detail later.

The automatic transmission 30 is coupled to the differential device 20. The automatic transmission 30 is configured to be able to change the ratio (speed ratio) between the rotation speed of the transmission member (the input shaft of the automatic transmission 30) connected to the differential device 20 and the rotation speed of a drive. shaft (the output shaft of the automatic transmission 30) connected to the differential gear unit 42. In addition, the automatic transmission 30 is configured to be able to establish a neutral state by releasing a predetermined clutch (described later). In the neutral state, transmission of power is interrupted between the differential device 20 and the differential gear unit 42 (drive wheels 44). In the present embodiment, the automatic transmission 30 is formed of a step-shift transmission that is able to change the speed ratio in a stepwise manner. Instead, the automatic transmission 30 may be formed of a continuously variable transmission. The differential gear unit 42 is coupled to the output shaft of the automatic transmission 30, and transmits power, output from the automatic transmission 30, to the drive wheels 44. The configuration of the automatic transmission 30 will also be described in detail later together with the differential device 20.

Each of the electrical storage devices A1, A2 is a rechargeable direct-current power supply, and is typically formed of a secondary battery, such as a lithium ion battery and a nickel metal hydride battery. Each of the electrical storage devices A1, A2 stores driving electric power, and supplies the stored electric power to the inverters 52, 54. In addition, the electrical storage device A1 is charged from a power supply (not shown) outside the vehicle (hereinafter, also referred to as "external power supply", and, furthermore, charging of the electrical storage device A1 from the external power supply is also referred to as "external charging") with electric power that is input to the charger 60. The electrical storage device A2 is charged with electric power that is generated by the motor generators MG1, MG2 of the differential device 20 and supplied from the inverters 52, 54. Instead of a secondary battery, each of the electrical storage devices A1, A2 may be formed of an electrical storage element other than a battery, such as an electric double layer capacitor, or a combination of a battery and an electrical storage element other than a battery.

Here, the electrical storage device A1 is formed of a so-called high-capacity electrical storage device having a high stored energy. Thus, it is possible to use the energy stored in the high-capacity electrical storage device A1 over a long period of time, so it is possible to extend a travel distance using electric energy.

On the other hand, the electrical storage device A2 is formed of a so-called high-power electrical storage device having a high output power. Thus, it is possible to supply high power from the electrical storage device A2 to the motor generators MG1, MG2 as needed, so it is possible to quickly ensure acceleration performance corresponding to user's accelerator operation. Thus, it is possible to constitute a high-capacity and high-power direct-current power supply using the two electrical storage devices A1, A2.

That is, these, electrical storage device A1 and electrical storage device A2 have such characteristics that the rated stored energy of the electrical storage device A1 is higher than the rated stored energy of the electrical storage device A2 and the rated output power of the electrical storage device A2 is higher than the rated output power of the electrical storage device A1.

The converter 50 is connected to the electrical storage device A2 via a positive electrode line PL2. The converter 50 steps up voltage from the electrical storage device A2 on the basis of a control signal from the control device 80, and outputs the stepped-up voltage to a positive electrode line PL3. In addition, the converter 50 steps down regenerated electric power, which is supplied from the inverters 52, 54 via the positive electrode line PL3, to the voltage level of the electrical storage device A2, and charges the electrical storage device A2. The electrical storage device A1 is connected to the positive electrode line PL3 via a positive electrode line PL1.

The inverter 52 is electrically connected to the positive electrode line PL3, and drives the motor generator MG1 included in the differential device 20 on the basis of a control signal from the control device 80. The inverter 54 is electrically connected to the positive electrode line PL3, and drives the motor generator MG2 included in the differential device 20 on the basis of a control signal from the control device 80. Each of the inverters 52, 54 is, for example, formed of a bridge circuit including three-phase power semiconductor switching elements.

The charger 60 is electrically connected to the electrical storage device A1 via the relay 64. The charger 60 charges the electrical storage device A1 by converting electric power from the external power supply to the voltage level of the electrical storage device A1 during external charging. The charger 60 may be electrically connected to the external power supply via a connector, a plug, or the like, or may be configured to contactlessly receive electric power from the external power supply via a coil, an antenna, or the like.

The diode 62 is provided in the positive electrode line PL1 so as to regulate flow of current from the inverters 52, 54 to the electrical storage device A1. Thus, it is possible to prevent flow of short-circuit current to the electrical storage device A1 due to regenerated electric power from the inverters 52, 54. In addition, with the above configuration, the electrical storage device A1 is not allowed to be charged with electric power that is generated by the motor generators MG1, MG2 of the differential device 20.

The relay 64 is provided in the positive electrode line PL1, and turns on or off on the basis of a control signal from the control device 80. When the relay 64 is turned on, the electrical storage device A1 and the inverters 52, 54 enter a conductive state. When the relay 64 is turned off, the electrical storage device A1 and the inverters 52, 54 enter a non-conductive state. Thus, it is possible to control electric power that is output from the electrical storage device A1. That is, when the relay 64 is turned on, electric power is allowed to be output from both the electrical storage devices A1, A2; whereas, when the relay 64 is turned off, electric power is allowed to be output from only the electrical storage device A2.

The electric power conversion system 70 is electrically connected between the outlet 72 and the positive electrode line PL3. The electric power conversion system 70 converts electric power that is input from the positive electrode line PL3 to electric power that is supplied to the outlet 72. The electric power conversion system 70 may be electrically connected between the outlet 72 and the positive electrode line PL2.

The outlet 72 is configured to allow insertion of a power plug of an electrical device (hereinafter, also referred to as "external device", and, furthermore, supply of electric power to the external device is also referred to as "external discharging") such as a home electric appliance, and is able to output electric power to the external device.

The control device 80 includes a central processing unit (CPU), a storage device, an input/output buffer, and the like, (all are not shown), and executes various controls (described later).

Figure 2:
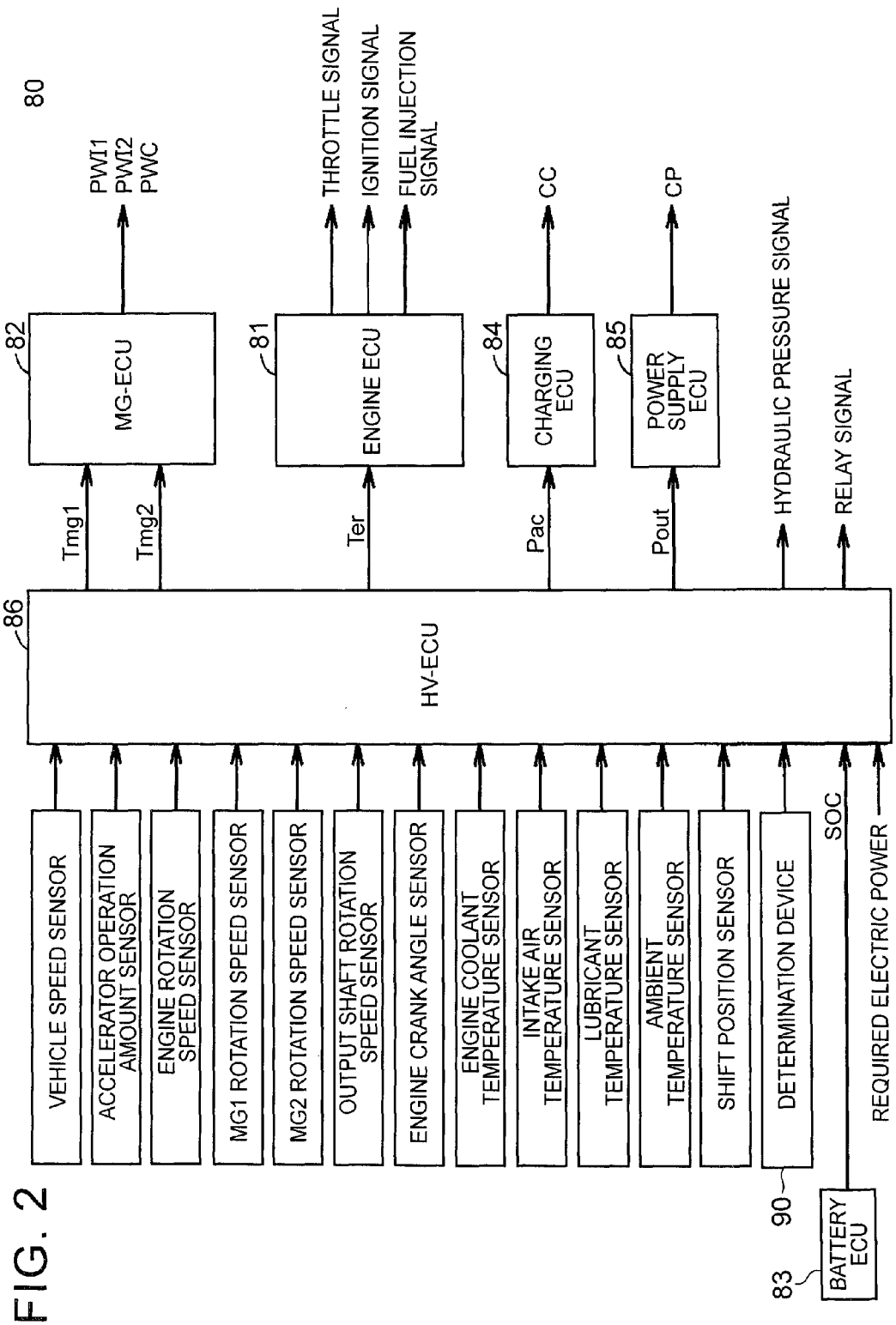
FIG. 2 is a view that shows the configuration of a control device shown in FIG. 1.

FIG. 2 is a view that shows the configuration of the control device 80 shown in FIG. 1. As shown in FIG. 2, the control device 80 includes an engine electronic control unit (ECU) 81, an MG-ECU 82, a battery ECU 83, a charging ECU 84, a power supply ECU 85 and an HV-ECU 86. Controls that are executed by the ECUs are not only limited to processing by software but may also be processed by exclusive hardware (electronic circuit). In the present embodiment, the control device 80 is formed of the above-described ECUs; instead, the control device 80 may be formed of a single ECU.

The engine ECU 81 generates a throttle signal, an ignition signal, a fuel injection signal, and the like, for driving the engine 10 on the basis of, for example, an engine torque command received from the HV-ECU 86, and outputs the generated control signals to the engine 10. The MG-ECU 82 generates control signals for controlling the converter 50 and the inverters 52, 54 on the basis of a command from the HV-ECU 86, and outputs the generated control signals to the converter 50 and the inverters 52, 54.

The battery ECU 83 estimates the state of charge (also referred to as "SOC", and is, for example, indicated in 0 to 100% where a full charge state is 100%) of each of the electrical storage devices A1, A2 on the basis of the voltage and current of each of the electrical storage devices A1, A2, which are respectively detected by a voltage sensor (not shown) and a current sensor (not shown), and outputs the estimated results to the HV-ECU 86. The charging ECU 84 generates a control signal for controlling the charger 60 on the basis of a command from the HV-ECU 86, and outputs the generated control signal to the charger 60. The power supply ECU 85 generates a control signal for controlling the electric power conversion system 70 on the basis of a command from the HV-ECU 86, and outputs the generated control signal to the electric power conversion system 70.

The HV-ECU 86 receives detected signals of various sensors, and generates various commands for controlling the devices of the hybrid vehicle 100. Specifically, the HV-ECU 86 receives a signal from a vehicle speed sensor, a signal from an accelerator operation amount sensor, a signal from an engine rotation speed sensor, a signal from an MG1 rotation speed sensor and a signal from an MG2 rotation speed sensor. The vehicle speed sensor detects the speed of the hybrid vehicle 100. The accelerator operation amount sensor detects the operation amount of an accelerator pedal. The engine rotation speed sensor detects the rotation speed of the engine 10. The MG1 rotation speed sensor detects the rotation speed of the motor generator MG1 (described later) included in the differential device 20. The MG2 rotation speed sensor detects the rotation speed of the motor generator MG2 (described later) included in the differential device 20.

In addition, the HV-ECU 86 further receives a signal from an output shaft rotation speed sensor, a signal from an engine crank angle sensor, a signal from an engine coolant temperature sensor, a signal from an intake air temperature sensor and a signal from a lubricant temperature sensor. The output rotation speed sensor detects the rotation speed of the output shaft of the differential device 20 (which corresponds to the input shaft of the automatic transmission 30). The engine crank angle sensor detects the crank angle of the engine 10. The engine coolant temperature sensor detects the temperature of coolant of the engine 10. The intake air temperature sensor detects the temperature of air taken into the engine 10. The lubricant temperature sensor detects the temperature of lubricant of the differential device 20 and automatic transmission 30.

Furthermore, the HV-ECU 86 further receives a signal from an ambient temperature sensor, a signal from a shift position sensor, a signal from a determination device, a signal indicating the SOC of each of the electrical storage devices A1, A2, and the like. The ambient temperature sensor detects the ambient temperature around the hybrid vehicle 100. The shift position sensor detects a shift position that is specified with the use of a shift lever. The determination device is used by the user to determine the level of an operating sound of the engine 10. The SOC of each of the electrical storage devices A1, A2 is estimated by the battery ECU 83. Furthermore, the HV-ECU 86 further receives a signal indicating electric power that is required by an external device that is connected to the outlet 72.

The HV-ECU 86, for example, generates an engine torque command Ter indicating a target output torque of the engine 10 on the basis of the above-described signals and outputs the target output torque to the engine ECU 81. The engine ECU 81 that has received the engine torque command Ter generates the throttle signal, ignition signal, fuel injection signal, and the like, for driving the engine 10, and outputs those signals to the engine 10.

In addition, the HV-ECU 86 generates torque commands Tmg1, Tmg2 for respectively driving the motor generators MG1, MG2 of the differential device 20 and outputs the torque commands Tmg1, Tmg2 to the MG-ECU 82. The HV-ECU 86 generates a charging command Pac for driving the charger 60 and outputs the charging command Pac to the charging ECU 84. The HV-ECU 86 generates a power supply command Pout for driving the electric power conversion system 70 and outputs the power supply command Pout to the power supply ECU 85. Furthermore, the HV-ECU 86 generates a hydraulic pressure signal for driving the automatic transmission 30 and outputs the hydraulic pressure signal to a hydraulic control device (not shown). In addition, the HV-ECU 86 generates a signal for turning on or off the relay 64 and outputs the signal to the relay 64.

The MG-ECU 82 that has received the torque command Tmg1 generates a signal PWI1 for controlling the inverter 52 such that the motor generator MG1 generates torque corresponding to the torque command Tmg1, and outputs the generated signal PWI1 to the inverter 52. The MG-ECU 82 that has received the torque command Tmg2 generates a signal PWI2 for controlling the inverter 54 such that the motor generator MG2 generates torque corresponding to the torque command Tmg2, and outputs the generated signal PWI2 to the inverter 54. In addition, the MG-ECU 82 generates a signal PWC for controlling the converter 50 and outputs the generated signal PWC to the converter 50.

The charging ECU 84 that has received the charging command Pac generates a signal CC for controlling the charger 60 such that the electrical storage devices A1, A2 are charged with electric power corresponding to the charging command Pac, and outputs the generated signal CC to the charger 60. In addition, the power supply ECU 85 that has received the power supply command Pout generates a signal CP for controlling the electric power conversion system 70 such that electric power corresponding to the power supply command Pout is output to the outlet 72, and outputs the generated signal CP to the electric power conversion system 70.

Furthermore, the HV-ECU 86 executes power control for controlling input/output electric powers of each of the electrical storage devices A1, A2. Specifically, when external discharging is carried out, the HV-ECU 86 generates a command for turning off the relay 64 and outputs the command to the relay 64. In this power control, the details will be described later.

Figure 3:
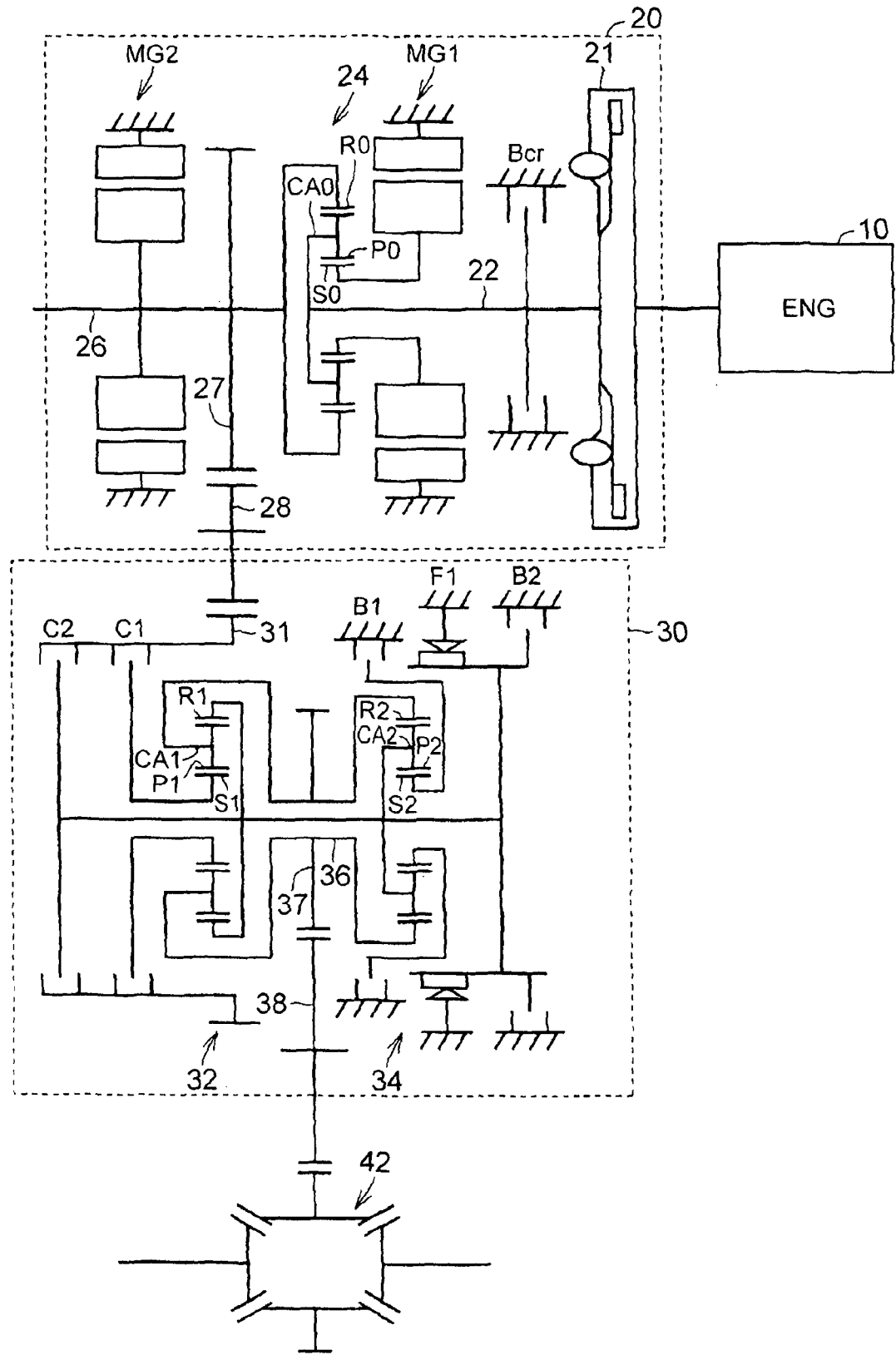
FIG. 3 is a view that shows the configurations of a differential device and automatic transmission that are shown in FIG. 1.

Next, the configuration of the differential device and automatic transmission will be described. FIG. 3 is a view that shows the configuration of the differential device 20 and automatic transmission 30 that are shown in FIG. 1. As shown in FIG. 3, the differential device 20 includes the motor generators MG1, MG2, the power split unit 24, a brake Bcr and a torsional damper 21. The torsional damper 21 transmits torque, which is output from the engine 10, to the power split unit 24.

The power split unit 24 is formed of a single-pinion-type planetary gear unit, and includes a sun gear S0, pinions P0, a carrier CA0 and a ring gear R0. The carrier CA0 is coupled to an input shaft 22, and supports the pinions P0 such that the pinions P0 are rotatable and revolvable. The input shaft 22 is coupled to the output shaft of the engine 10 via the torsional damper 21. The sun gear S0 is coupled to the rotary shaft of the motor generator MG1. The ring gear R0 is coupled to a drive shaft 26, and is configured to be in mesh with the sun gear S0 via the pinions P0. The rotary shaft of the motor generator MG2 is coupled to the drive shaft 26. That is, the ring gear R0 is also coupled to the rotary shaft of the motor generator MG2.

Figures 4, 5:
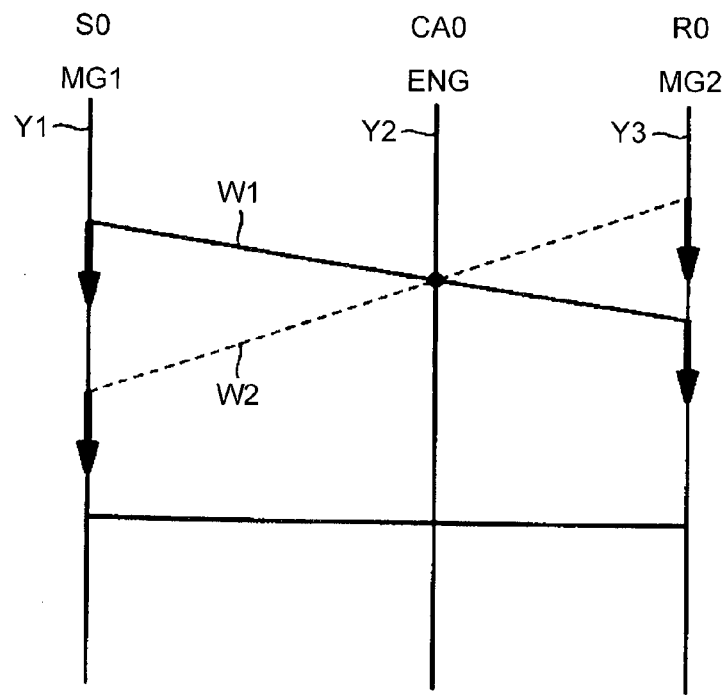
FIG. 4 is a view that shows an engagement operation chart of the automatic transmission shown in FIG. 3.
FIG. 5 is a nomograph of the differential device shown in FIG. 1.

The power split unit 24 functions as a differential device through relative rotation among the sun gear S0, the carrier CA0 and the ring gear R0. The rotation speeds of the sun gear S0, carrier CA0 and ring gear R0 have a relationship connected by a straight line in the nomograph (FIG. 5). With the differential function of the power split unit 24, power that is output from the engine 10 is distributed between the sun gear S0 and the ring gear R0. The motor generator MG1 operates as a generator using the power distributed to the sun gear S0. Electric power generated by the motor generator MG1 is supplied to the motor generator MG2 or stored in the electrical storage device A2 (FIG. 1). The motor generator MG1 generates electric power using the power distributed from the power split unit 24 or the motor generator MG2 is driven using electric power generated by the motor generator MG1. Thus, the differential device 20 functions as a continuously variable transmission.

The brake Bcr is a friction engagement device that is operated by hydraulic pressure. The brake Bcr is, for example, formed of a wet multi-disc type in which a plurality of stacked friction plates are pressed by hydraulic pressure or a band brake in which one end of a band wound around the outer periphery of a rotating drum is fastened by hydraulic pressure.

In the differential device 20, the input shaft 22 is non-rotatable when the brake Bcr is in an engaged state, and the input shaft 22 is rotatable when the brake Bcr is in a released state. When the engine 10 is in an operated state, the brake Bcr is placed in the released state, and the power of the engine 10 is input to the power split unit 24 via the input shaft 22.

On the other hand, when the engine 10 is in a stopped state, the brake Bcr is placed in the engaged state, so it is possible to support the carrier CA0 of the power split unit 24 such that the carrier CA0 is non-rotatable. Thus, the hybrid vehicle 100 is able to travel in an EV drive mode using the driving forces of both the motor generators MG1, MG2. Thus, it is possible to improve driving performance in the EV drive mode.

The brake Bcr may be formed of a dog clutch. In this case, it is possible to reduce drag torque when the brake Bcr is in the released state. Therefore, it is possible to suppress a loss of torque, output from the engine 10, due to the brake Bcr.

The automatic transmission 30 includes single-pinion-type planetary gear units 32, 34, clutches C1, C2, brakes B1, B2 and a one-way clutch F1. The planetary gear unit 32 includes a sun gear S1, pinions P1, a carrier CA1 and a ring gear R1. The planetary gear unit 34 includes a sun gear S2, pinions P2, a carrier CA2 and a ring gear R2.

Each of the clutches C1, C2 and brakes B1, B2 is a friction engagement device that is operated by hydraulic pressure. Each of the clutches C1, C2 and brakes B1, B2 is, for example, formed of a wet multi-disc type in which a plurality of stacked friction plates are pressed by hydraulic pressure or a band brake in which one end of a band wound around the outer periphery of a rotating drum is fastened by hydraulic pressure. The one-way clutch F1 supports the mutually coupled carrier CA2 and ring gear R1 such that the carrier CA2 and the ring gear R1 are rotatable in one direction and non-rotatable in the other direction.

In the automatic transmission 30, the engagement devices, that is, the clutches C1, C2, the brakes B1, B2 and the one-way clutch F1 are engaged in accordance with the engagement operation chart shown in FIG. 4. Thus, any one of a first speed gear position to a fourth speed gear position and a reverse gear position is selectively established. In FIG. 4, "0" indicates the engaged state. "(0)" indicates that engine braking is activated when the brake is engaged. "A" indicates that it is engaged only when it is driven. A blank indicates the released state. In addition, by setting all the engagement devices, that is, the clutches C1, C2 and the brakes B1, B2, in the released state, it is possible to establish the neutral state (state where transmission of power is interrupted).

Referring back to FIG. 3, the differential device 20 and the automatic transmission 30 are coupled by a transmission member 28. An output shaft 36 that is coupled to the ring gear R2 of the planetary gear unit 34 is coupled to the differential gear unit 42 by the transmission member 38.

In the differential device 20, by appropriately executing rotation control over the motor generators MG1, MG2, a continuously variable shift in which the rotation speed of the ring gear R0, that is, the rotation speed of the drive shaft 26, is continuously variable with respect to a predetermined rotation speed of the engine 10 that is coupled to the carrier CA0 is achieved. By coupling the automatic transmission 30 having a variable speed ratio between the drive shaft 26 and the output shaft 36 to the differential device 20 having such a continuously variable function, it is possible to reduce the speed ratio of the differential device 20 while having a continuously variable shift function achieved by the differential device 20, so it is possible to reduce a loss of the motor generators MG1, MG2.

A state where the rotation speed of the motor generator MG1 (the rotation speed of the sun gear S0) is zero is referred to as "mechanical point" at which electric power does not flow through the motor generator MG1 and the power of the engine 10 is transmitted without being electrically converted. At the "mechanical point", no "power splitting" or "power circulation" occurs, and power transfer efficiency is high. The "power splitting" is that electric power generated by the motor generator MG1 using the power of the engine 10 is supplied to the motor generator MG2, and driving force is generated. The "power circulation" is that electric power generated by the motor generator MG2 flows through the motor generator MG1. In the hybrid vehicle 100, it is possible to form a plurality of "mechanical points" in the differential device 20 on the basis of the speed position of the automatic transmission 30, so it is possible to achieve high power transfer efficiency even in various driving situations.

Next, power control will be described. The hybrid vehicle 100 includes the high-capacity electrical storage device A1 and the high-power electrical storage device A2. The electrical storage device A1 is configured to be chargeable from a power supply outside the vehicle. Thus, it is possible to use electric power supplied from the power supply outside the vehicle and stored in the high-capacity electrical storage device A1 over a long period of time, so it is possible to extend an electric vehicle travel range that the hybrid vehicle is able to travel using electric power supplied from the power supply outside the vehicle and stored in the electrical storage device.

On the other hand, the electrical storage device A2 is configured to be chargeable by the motor generators MG1, MG2. Thus, it is possible to exchange high power between the electrical storage device A2 and the motor generators MG1, MG2 as needed, so it is possible to quickly ensure acceleration performance corresponding to user's accelerator operation, and it is possible to efficiently recover energy during deceleration of the vehicle.

Here, it is conceivable that, when a device outside the vehicle needs electric power, electric power stored in the electrical storage device is supplied to the device outside the vehicle. However, if electric power stored in the electrical storage device A1 is supplied to, for example, the device outside the vehicle, an electric vehicle travel range that the vehicle is able to travel using electric power supplied from the power supply outside the vehicle and stored in the electrical storage device reduces. In the present embodiment, power control for controlling the input/output electric powers of each of the electrical storage devices A1, A2 is executed. Specifically, when external discharging is carried out, the relay 64 is turned off. Thus, electric power is supplied from the electrical storage device A2 to the external device, and electric power is not supplied from the electrical storage device A1 to the external device. Therefore, it is possible to suppress usage of electric power, stored in the electrical storage device A1, other than travel of the hybrid vehicle 100. Thus, it is possible to suppress a reduction in the electric vehicle travel range. On the other hand, when the motor generators MG1, MG2 generate driving force, the relay 64 is turned on. Thus, electric power is supplied from both the electrical storage devices A1, A2 to the motor generators MG1, MG2.

Here, the SOC of the electrical storage device A2 may decrease through external discharging. If the SOC of the electrical storage device A2 decreases, the electrical storage device A2 needs to be charged. At this time, it is desirable to efficiently generate electric power for charging the electrical storage device A2. In the present embodiment, when the SOC of the electrical storage device A2 has decreased, the automatic transmission 30 is set to the neutral state, and the motor generators MG1, MG2 generate electric power using power from the engine 10 (hereinafter, also referred to as "engine power generation"). Thus, it is possible to operate the engine 10 and the motor generators MG1, MG2 at an operating point having high power generation efficiency. Hereinafter, the engine power generation will be described in detail.

FIG. 5 is a nomograph of the differential device 20. As shown in FIG. 3 together with FIG. 5, the vertical line Y1 in the nomograph indicates the rotation speed of the sun gear S0 of the power split unit 24, that is, the rotation speed of the motor generator MG1. The vertical line Y2 indicates the rotation speed of the carrier CA0 of the power split unit 24, that is, the rotation speed of the engine 10. The vertical line Y3 indicates the rotation speed of the ring gear R0 of the power split unit 24, that is, the rotation speed of the motor generator MG2. The interval between any adjacent two of the vertical lines Y1 to Y3 is set on the basis of the gear ratio of the power split unit 24.

During engine power generation, the engine 10 is operated at a rotation speed at which it is possible to most efficiently output a required power. At this time, the automatic transmission 30 is placed in a power interrupted state, so it is possible to operate the motor generators MG1, MG2 at rotation speeds at which it is possible to most efficiently generate electric power without generating driving force for the drive wheels 44. As an example, an operating state indicated by the solid line W1 or an operating state indicated by the dashed line W2 may be selected in consideration of the efficiency of each of the motor generators MG1, MG2. Thus, the engine 10 and the motor generators MG1, MG2 are operated in an operating state having high operation efficiency. Therefore, it is possible to improve power generation efficiency during engine power generation.

Furthermore, in engine power generation, it may be desirable that the operating sound of the engine 10 be quiet. For example, when electric power is generated in the nighttime or when electric power is generated in a quiet place, it is desirable to suppress the operating sound of the engine 10. In the present embodiment, there is provided the determination device that allows the user to determine the level of the operating sound of the engine 10. As the level of the operating sound, which is determined by the user, decreases, the operating point of the engine 10 is set such that the rotation speed of the engine 10 is decreased while the output power of the engine 10 is kept. Hereinafter, the details will be described.

Figure 6:
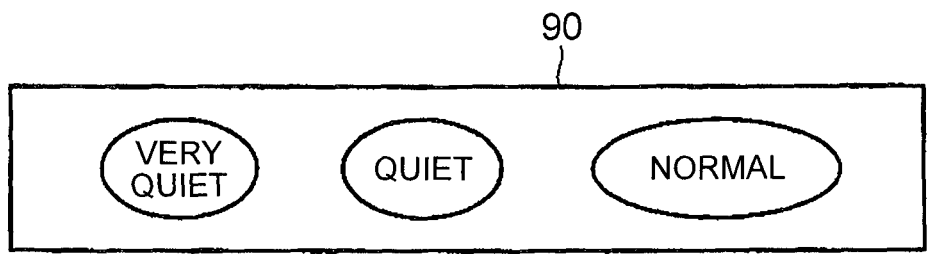
FIG. 6 is a view that shows an example of a determination device for determining the level of an operating sound of an engine in a controller provided in the electromotive vehicle.

FIG. 6 is a view that shows an example of the determination device for determining the level of the operating sound of the engine 10. As shown in FIG. 6, the determination device 90 is, for example, shown on a multi-information display arranged near a driver seat. The multi-information display includes a touch panel for inputting user's operation.

The determination device 90 is configured to be able to select "very quiet", "quiet" or "normal". When "normal" is selected, the engine 10 is operated during engine power generation at a rotation speed at which it is possible to most efficiently output a required power. When "quiet" is selected, the upper limit rotation speed of the engine 10 is set to a predetermined value N1. When "very quiet" is selected, the upper limit rotation speed of the engine 10 is set to a predetermined value N2 lower than the predetermined value N1.

Figure 7:
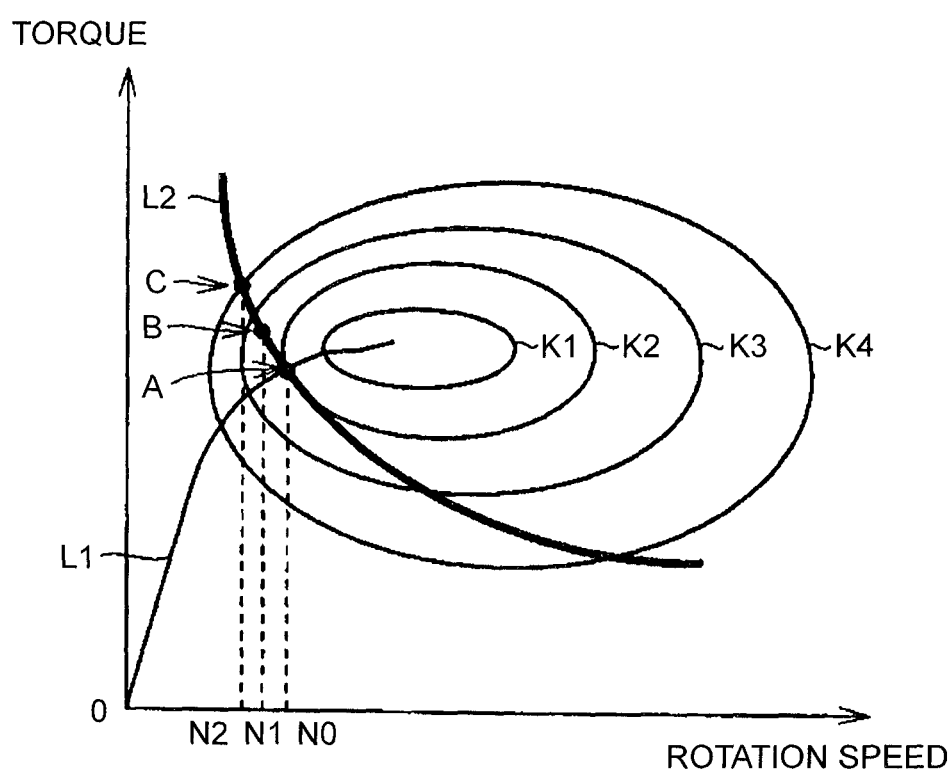
FIG. 7 is a graph that shows an operation line of the engine provided in the vehicle.

FIG. 7 is a graph that shows the operating line of the engine 10. As shown in FIG. 7, the abscissa axis represents the rotation speed of the engine 10, and the ordinate axis represents the torque of the engine 10. Each of the curves K1 to K4 is an iso efficiency curve, and the efficiency of the engine 10 decreases as the operating point shifts from the curve K1 to the curve K4. The operating line L1 indicates the correlation between the torque of the engine 10 and the rotation speed of the engine 10, and is set such that the operation efficiency of the engine 10 improves. The equal power line L2 indicates the correlation between the torque of the engine 10 and the rotation speed of the engine 10, corresponding to an engine required power Pe for the engine 10.

As shown in FIG. 6 together with FIG. 7, during engine power generation, when "normal" is selected, the engine 10 is operated at an operating point on the operating line L1 such that the operation efficiency improves. When the engine required power is Pe, the engine 10 is operated at an operating point A that is the intersection of the operating line L1 with the equal power line L2.

During engine power generation, when "quiet" is selected, the upper limit rotation speed of the engine 10 is set to the predetermined value N1. In the case where the engine required power is Pe, when the rotation speed NO of the operating point A is higher than the predetermined value N1, the engine 10 is operated at an operating point B corresponding to the rotation speed N1 of the equal power line L2.

Similarly, during engine power generation, when "very quiet" is selected, the upper limit rotation speed of the engine 10 is set to the predetermined value N2. In the case where the engine required power is Pe, when the rotation speed NO of the operating point A is higher than the predetermined value N2, the engine 10 is operated at an operating point C corresponding to the rotation speed N2 of the equal power line L2.

As described above, it is possible to suppress the operating sound of the engine by limiting the rotation speed of the engine 10 on the basis of user's operation. At this time, the operating point is changed such that the output power of the engine 10 is kept.

Figure 8:
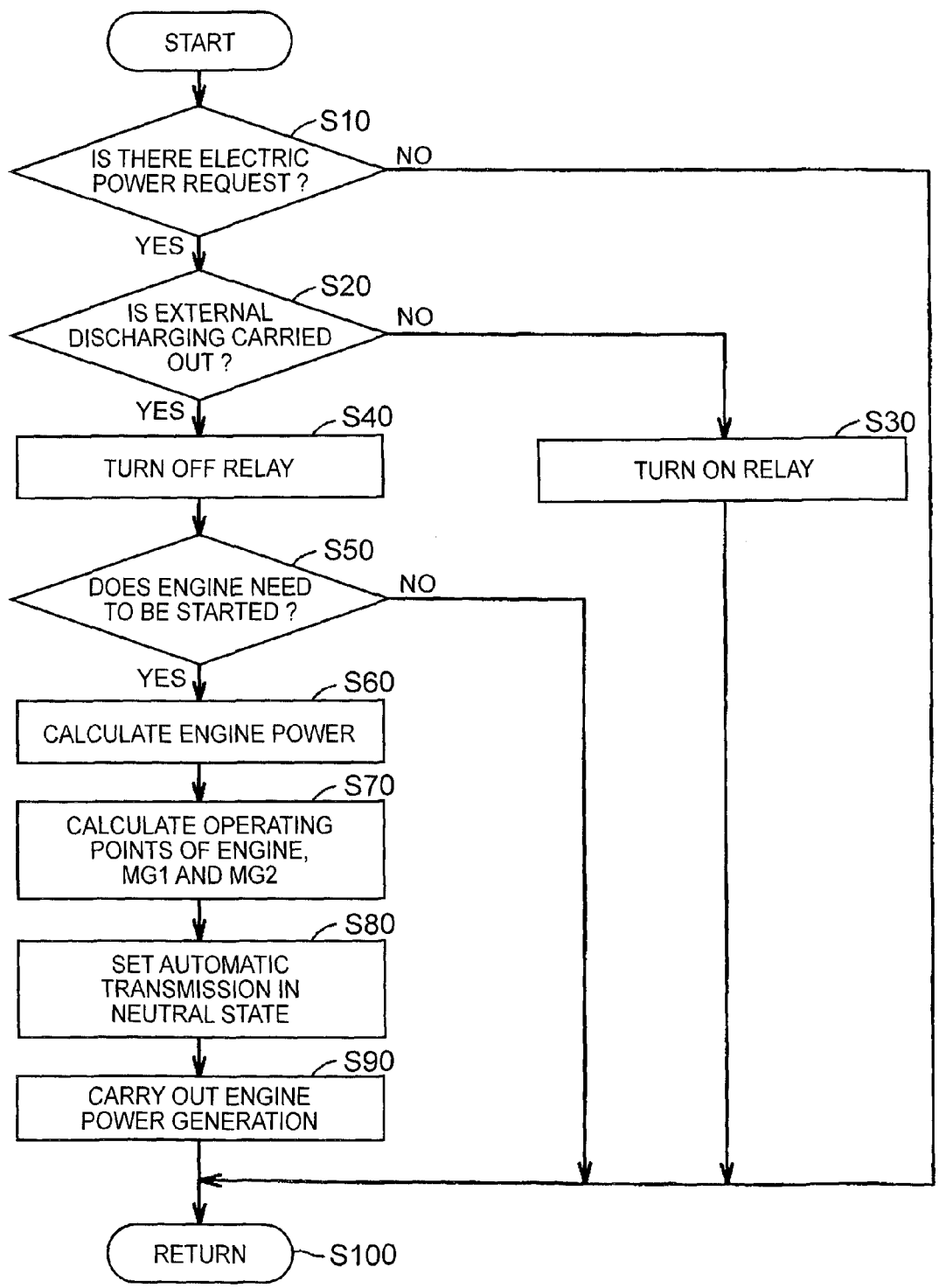
FIG. 8 is a flowchart that illustrates the procedure of electric power control that is executed by the control device shown in FIG. 1.

FIG. 8 is a flowchart that illustrates the procedure of power control that is executed by the control device 80 shown in FIG. 1. Each step in the flowchart is implemented by calling a program prestored in the control device 80 from a main routine and is executed at predetermined intervals or in response to the fact that a predetermined condition is satisfied. Alternatively, for all or part of the steps, exclusive hardware (electronic circuit) may be constructed to implement processing.

As shown in FIG. 8, the control device 80 determines whether there is an electric power request from a load (step S10). Specifically, the control device 80 determines that there is an electric power request from the load when it is required to supply electric power to the motor generators MG1,MG2 or the external device. When there is no electric power request from the load, the process proceeds to step S100 without executing the following series of processes.

When it is determined in step S10 that there is an electric power request from the load (YES in step S10), the control device 80 determines whether external discharging is carried out (step S20). When it is determined that external discharging is not carried out (NO in step S20), the control device 80 generates a signal for turning on the relay 64, and outputs the generated signal to the relay 64 (step S30). Thus, driving electric power is supplied from the electrical storage devices A1, A2 to the motor generators MG1, MG2.

When it is determined in step S20 that external discharging is carried out (YES in step S20), the control device 80 generates a signal for turning off the relay 64, and outputs the generated signal to the relay 64 (step S40). Thus, electric power is not supplied from the electrical storage device A1 to the external device.

Subsequently, the control device 80 determines whether the engine 10 needs to be started (step S50). Specifically, the control device 80 determines that the engine 10 needs to be started when the SOC of the electrical storage device A2 becomes lower than a predetermined threshold. The threshold is a value for determining whether the electrical storage device A2 is sufficiently charged. When it is determined that the engine 10 does not need to be started (NO in step S50), electric power is supplied from the electrical storage device A2 to the external device. The control device 80 may determine that the engine 10 needs to be started when an electric power outputtable from the electrical storage device A2 is lower than an electric power required to carry out external discharging.

Here, the SOC is used as the state quantity that indicates the state of charge of the electrical storage device A2. It may be determined whether the electrical storage device. A2 is sufficiently charged by comparing another state quantity that indicates the state of charge of the electrical storage device A2 (for example, the voltage of the electrical storage device A2, or the like) with a predetermined threshold, instead of the SOC.

When it is determined in step S50 that the engine 10 needs to be started (YES in step S50), the control device 80 calculates a target power of the engine 10 (step S60). Specifically, the control device 80 sets an electric power obtained by subtracting an electric power, which is output from the electrical storage device A2, from an electric power required to carry out external discharging as the target power of the engine 10.

Subsequently, the control device 80 calculates the operating points of the engine 10 and motor generators MG1, MG2 on the basis of the target power of the engine 10, calculated in step S60 (step S70). Specifically, the control device 80 calculates a target rotation speed and a target torque, at which the engine 10 is able to most efficiently output the target power.

Here, the control device 80 limits the rotation speed of the engine 10 on the basis of user's operation that is input from the determination device 90 (FIG. 6). Specifically, when "quiet" is selected by the user, the control device 80 limits the rotation speed of the engine 10 to the predetermined value N1 or below. When "very quiet" is selected by the user, the control device 80 limits the rotation speed of the engine 10 to the predetermined value N2 or below. The predetermined value N2 is lower than the predetermined value N1.

The control device 80 calculates the operating points of the motor generators MG1, MG2 on the basis of the thus calculated operating point of the engine 10. Specifically, the control device 80 calculates a target rotation speed, and target torque of each of the motor generators MG1, MG2 such that the power of the engine 10 is most efficiently converted to electric power.

Subsequently, the control device 80 controls the automatic transmission 30 such that the automatic transmission 30 is placed in the neutral state (step S80). Thus, transmission of power is interrupted between the differential device 20 and the drive wheels 44, so it is possible to selectively change the operating points of the motor generators MG1, MG2.

Subsequently, the control device 80 carries out engine power generation (step S90). Specifically, the control device 80 generates signals such that the engine 10 and the motor generators MG1, MG2 are operated at the corresponding operating points calculated in step, S70, and outputs the generated signals to the engine 10 and the inverters 52, 54. Thus, generated electric power obtained through engine power generation and electric power from the electrical storage device A2 are supplied to the external device.

As described above, in the present embodiment, the electrical storage device A1 is charged from the power supply outside the vehicle, and the electrical storage device A2 is charged by the motor generators MG1, MG2. When electric power is output to a device outside the vehicle, electric power output from the electrical storage device A1 is limited such that electric power stored in the electrical storage device A2 is output. Thus, it is possible to prevent usage of electric power, stored in the electrical storage device A1, other than travel of the hybrid vehicle 100. Thus, according to the present embodiment, in the hybrid vehicle 100 that includes the electrical storage device A1 that stores electric power supplied from the power supply outside the vehicle, it is possible to suppress a decrease in the electric vehicle travel range.

In addition, according to the present embodiment, when the motor generators MG1, MG2 are supplied with electric power, it is allowed to output electric power from the electrical storage device A1, so it is possible to use electric power, stored in the electrical storage device A1, for traveling.

In addition, according to the present embodiment, the automatic transmission 30 is provided between the differential device 20 and the drive wheels 44, and the motor generators MG1, MG2 generate electric power using power from the engine 10 when the automatic transmission 30 is in the neutral state (power interrupted state). Thus, it is possible to operate the engine 10 and the motor generators MG1, MG2 at the operating points having high efficiency, so it is possible to improve power generation efficiency.

In addition, according to the present embodiment, the operating point of the engine 10 is set such that, as the operating sound of the engine 10 is more strictly restricted, the rotation speed of the engine 10 decreases such that the output power of the engine 10 is kept. Thus, it is possible to reduce the operating sound of the engine 10 while keeping the power of the engine 10.

In the above-described embodiment, the electromotive vehicle is the hybrid vehicle on which the engine 10 is mounted. However, the scope of the invention is not limited to the above-described hybrid vehicle, and also includes an electric vehicle on which no engine is mounted, a fuel cell vehicle on which a fuel cell is further mounted as an energy source, and the like.

In addition, in the above description, the hybrid vehicle 100 includes the automatic transmission 30, and transmission of power to the drive wheels 44 is interrupted by the automatic transmission 30 during engine power generation. Another power transmission device that is able to switch between a power transmitted state where power is transmitted between the differential device 20 and the drive wheels 44 and a power interrupted state where transmission of power therebetween is interrupted may be provided instead of the automatic transmission 30. For example, it is applicable that only clutch is provided instead of the automatic transmission 30 and engine power generation is carried out while the clutch is released or the clutch is controlled to a released state during engine power generation.

In addition, in the above description, the hybrid vehicle 100 includes the diode 62 and restricts flow of current from the inverters 52, 54 to the electrical storage device A1. A switch may be provided between the inverters 52, 54 and the electrical storage device A1, instead of the diode 62. The switch turns on or off on the basis of a signal from the control device 80. The control device 80 is able to control the switch such that flow of current from the inverters 52, 54 to the electrical storage device A1 is suppressed in consideration of charging efficiency at the time when the electrical storage device A1 is charged with electric power generated by the motor generators MG1, MG2, the durability of the electrical storage device A1, or the like. The switch may be a relay or a switching element.

In addition, in the above description, the hybrid vehicle 100 includes the relay 64. A switching element may be provided instead of the relay 64.

In the above description, the motor generators MG1, MG2 correspond to one example of a "rotary electric machine" according to the invention, and the automatic transmission 30 corresponds to one example of a "power transmission device" according to the invention. In addition, the diode 62 corresponds to one example of a "suppressing device" according to the invention, and the relay 64' corresponds to one example of an "output limiting device" according to the invention. In addition, the inverters 52, 54 correspond to one example of a "driving device" according to the invention.

What is claimed is:

1. An electromotive vehicle comprising:
   a first electrical storage device configured to store driving electric power;
   a charging device configured to charge the first electrical storage device with use of a power supply outside the vehicle;
   a rotary electric machine configured to have a power generation function;
   a second electrical storage device configured to store electric power generated by the rotary electric machine; and
   a controller configured to suppress flow of electric power generated by the rotary electric machine to the first electrical storage device, the controller being configured to output-electric power to a device outside the vehicle, and the controller being configured to, when electric power is output to the device outside the vehicle, limit electric power to be output from the first electrical storage device, such that electric power stored in the second electrical storage device is output.

2. The electromotive vehicle according to claim 1, wherein
   the controller includes a suppressing device configured to suppress flow of electric power generated by the rotary electric machine to the first electrical storage device.

3. The electromotive vehicle according to claim 1, wherein
   the controller includes an electric power output device configured to output electric power to the device outside the vehicle.

4. The electromotive vehicle according to claim 1, wherein
   the controller includes an output limiting device configured to, when electric power is output to the device outside the vehicle, limit electric power to be output from the first electrical storage device, such that electric power stored in the second electrical storage device is output.

5. The electromotive vehicle according to claim 4, wherein
   the controller includes an interrupting device configured to interrupt output of electric power from the first electrical storage device.

6. The electromotive vehicle according to claim 5, further comprising:
   a driving device configured to drive the rotary electric machine, wherein
   the interrupting device includes a relay provided between the driving device and the first electrical storage device.

7. The electromotive vehicle according to claim 1, wherein the controller is configured to cancel limitations on output of electric power from the first electrical storage device when the rotary electric machine generates travel driving force.

8. The electromotive vehicle according to claim 1, further comprising:
   an internal combustion engine mechanically coupled to the rotary electric machine; and
   a power transmission device configured to switch between a power transmitted state where power is transmitted to a drive wheel and a power interrupted state where transmission of power to the drive wheel is interrupted, wherein
   the controller is configured to, in a case where a state quantity that indicates a state of charge of the second electrical storage device has decreased, control the rotary electric machine such that the rotary electric machine generates electric power using power from the internal combustion engine when the power transmission device is in the power interrupted state.

9. The electromotive vehicle according to claim 8, further comprising:
   a planetary gear unit mechanically coupled to an output shaft of the internal combustion engine, a rotary shaft of the rotary electric machine and a drive shaft, wherein
   the power transmission device is provided between the drive shaft and the drive wheel.

10. The electromotive vehicle according to claim 8, wherein
the power transmission device is a transmission, and the transmission is configured to be placed in a neutral state when the state quantity that indicates the state of charge of the second electrical storage device has decreased.

11. The electromotive vehicle according to claim 8, wherein
the controller is configured to allow a user to determine a level of an operating sound of the internal combustion engine, the controller being configured to set an operating point of the internal combustion engine such that, as the level of the operating sound decreases, a rotation speed of the internal combustion engine decreases while output power of the internal combustion engine is kept.

12. The electromotive vehicle according to claim 11, wherein the controller includes a determination device configured to allow the user to determine the level of the operating sound of the internal combustion engine.

13. The electromotive vehicle according to claim 1, further comprising:
a driving device configured to drive the rotary electric machine, the controller including a diode provided between the driving device and the first electrical storage device.

14. The electromotive vehicle according to claim 1, wherein
a rated stored energy of the first electrical storage device is higher than a rated stored energy of the second electrical storage device, and a rated output power of the second electrical storage device is higher than a rated output power of the first electrical storage device.

15. A control method for an electromotive vehicle, the electromotive vehicle including a first electrical storage device configured to store driving electric power; a charging device configured to charge the first electrical storage device with use of a power supply outside the vehicle; a rotary electric machine configured to have a power generation function; a second electrical storage device configured to store electric power that is generated by the rotary electric machine; and a controller configured to suppress flow of electric power generated by the rotary electric machine to the first electrical storage device, the controller being configured to output electric power to a device outside the vehicle, the controller being configured to limit electric power to be output from the first electrical storage device, the control method comprising:
when electric power is output to the device outside the vehicle, limiting electric power to be output from the first electrical storage device, such that electric power stored in the second electrical storage device is output.

* * * * *